(12) United States Patent
Metzger et al.

(10) Patent No.: US 7,742,153 B2
(45) Date of Patent: Jun. 22, 2010

(54) MINIATURE OPTO-MECHANICAL ANEMOMETER

(75) Inventors: Meredith Metzger, Salt Lake City, UT (US); Curtis King, Kirkland, WA (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 11/906,490

(22) Filed: Oct. 1, 2007

(65) Prior Publication Data

US 2008/0088819 A1 Apr. 17, 2008

Related U.S. Application Data

(60) Provisional application No. 60/848,982, filed on Oct. 2, 2006.

(51) Int. Cl.
*G01P 3/36* (2006.01)
(52) U.S. Cl. ....................................................... 356/28
(58) Field of Classification Search ........ 356/3.01–28.5
See application file for complete search history.

(56) References Cited

U.S. PATENT DOCUMENTS

| | | | |
|---|---|---|---|
| 4,195,931 A | 4/1980 | Hara | |
| 4,201,467 A | 5/1980 | Hartmann et al. | |
| 4,476,875 A * | 10/1984 | Nilsson et al. | 600/479 |
| 4,575,238 A | 3/1986 | Knuhtsen et al. | |
| 4,621,929 A | 11/1986 | Phillips | |
| 4,631,958 A | 12/1986 | Van Cauwenberghe et al. | |
| 4,637,716 A | 1/1987 | Auweter | |
| 4,662,749 A | 5/1987 | Hatton et al. | |
| 4,818,071 A | 4/1989 | Dyott | |
| 5,004,913 A | 4/1991 | Kleinerman | |
| 5,023,845 A | 6/1991 | Crane et al. | |
| 5,115,127 A | 5/1992 | Bobb | |
| 5,120,951 A * | 6/1992 | Small | 250/227.21 |

(Continued)

FOREIGN PATENT DOCUMENTS

DE 103 39 907 3/2005

OTHER PUBLICATIONS

Campbell Scientific, Inc., "3-D soic Anemometer Model" Model CSAT3, www.campbellsci.com, Jan. 2004, 2 pages.

*Primary Examiner*—Thomas H Tarcza
*Assistant Examiner*—Luke D Ratcliffe
(74) *Attorney, Agent, or Firm*—Thorpe North & Western LLP

(57) ABSTRACT

An opto-mechanical anemometer is particularly adapted to measure fluctuations in the flow of a turbulent fluid such as can be applied in the measurement of wind turbulence for meteorological purposes, the turbulent flow of fluid through a pipe or conduit, or the flow of air through a tube from the breath of a patient for medical diagnostics. An optical fiber is positioned in the flow path of the fluid and fixed motionless at one end. The free end is caused to bend in response to fluctuations in the flow. A beam of light is projected out the free end of the optical fiber toward a stationary optical detector placed in the path of the beam, which is sensitive to the point of maximum intensity of the beam of light. Deflection of the optical fiber translates into movement of the light beam over the detector, allowing measurement of the speed and direction of the fluid flow in two orthogonal planes.

36 Claims, 4 Drawing Sheets

U.S. PATENT DOCUMENTS

| | | |
|---|---|---|
| 5,488,224 A | 1/1996 | Fagan et al. |
| 5,638,174 A | 6/1997 | Henderson |
| H1688 H | 11/1997 | Lake et al. |
| 5,827,976 A * | 10/1998 | Stouffer et al. ............ 73/861.19 |
| 5,865,871 A | 2/1999 | Simundich |
| 6,166,806 A | 12/2000 | Tjin |
| 6,510,842 B2 | 1/2003 | Ismailov |
| 6,559,932 B1 * | 5/2003 | Halmos ..................... 356/28.5 |
| 6,847,437 B2 | 1/2005 | Bruel |
| 6,874,480 B1 * | 4/2005 | Ismailov ..................... 123/494 |
| 2002/0014224 A1 | 2/2002 | Ismailov |
| 2005/0157291 A1 | 7/2005 | Bustamante et al. |

\* cited by examiner

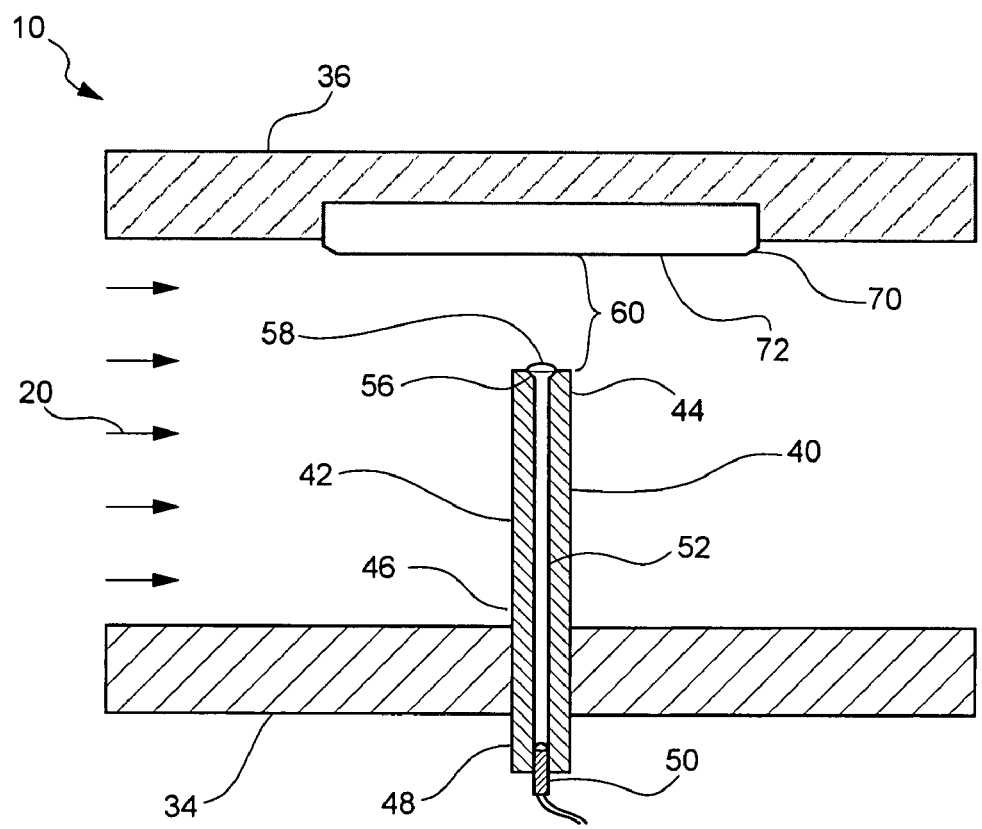
*Fig. 1*
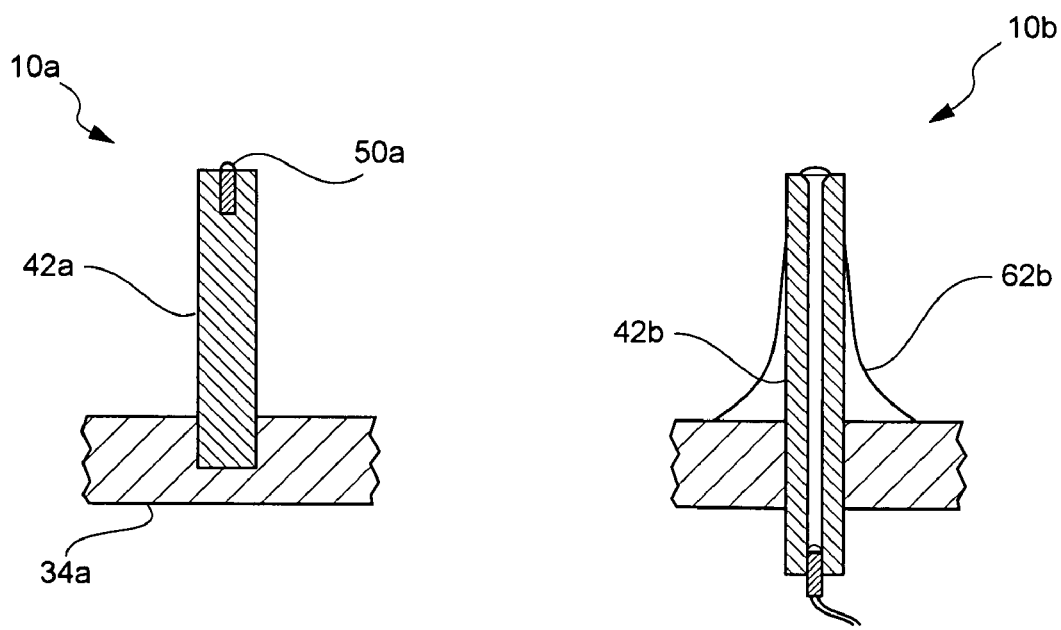
*Fig. 1a*  *Fig. 1b*

MINIATURE OPTO-MECHANICAL ANEMOMETER

RELATED APPLICATIONS

This application claims priority to U.S. Provisional Patent Application No. 60/848,982, filed Oct. 2, 2006, in the United States Patent and Trademark Office, and entitled, "Miniature Opto-Mechanical Anemometer," which application is incorporated by reference in its entirety herein.

FIELD OF THE INVENTION

The field of the invention relates generally to the measurement of the speed and direction of a moving fluid, and more specifically to anemometers which measure the speed and direction of wind.

BACKGROUND OF THE INVENTION AND RELATED ART

Accurate measurement of wind turbulence is important in any meteorological study where the stability of the atmosphere must be determined. Atmospheric turbulence is the irregular fluctuation of horizontal and vertical wind currents, and is primarily the result of thermal and mechanical forces on the air parcels, thereby producing turbulent motions or eddies of varying sizes. A few areas where the measurement of turbulence has become critically important include pollutant dispersion studies, long-range weather forecasting, wind energy siting, wind shear warning, emergency response wind monitoring, sound transmission analyses, microwave communications assessments and aircraft vortex monitoring.

Several classes of instruments exist which can measure wind speed and direction, but unfortunately, also incorporate inherent limitations which have led to a plateau in the breadth and resolution of wind turbulence data available to scientists and meteorologists. The most common instrument for measuring wind speed and direction is also the oldest: the cup and vane anemometer. Originally invented over a hundred years ago, this inexpensive device can be mounted at stationary locations or on slow-moving vehicles and ships, but is only capable of measuring the mean wind speed and direction; meanwhile, small-scale wind gusts remain undetected. As a result, the cup and vane anemometer has proven inadequate for wind turbulence monitoring.

A more recent advancement is the sonic anemometer, which determines the mean wind speed and direction at a location immediately adjacent the instrument. The instrument can also measure atmospheric turbulence, but only with a limited frequency response typically below 20 Hz. The sonic anemometer operates on the principle that the motion of air affects the propagation of ultrasonic sound waves. The instrument uses a proscribed sonic pathway through a test region, typically between 10 and 20 centimeters in length, with a transmitter on one end and a receiver on the other. Several commercial designs employ three pathways orientated at various angles through the same test region to provide real-time three-dimensional measurement of the air velocity. However, the instrument has several drawbacks. The instrument is bulky and heavy, both because of the size of the test region and because the transmitters and receivers are commonly positioned on the tips of long arms in order to be as aerodynamically unobtrusive as possible to avoid inducing turbulence within the measurement region. Because of it's bulk and weight, the application of the sonic anemometer is limited to ground or ship-based operations. As the tallest practical weather tower may be approximately 150 m (500 ft), accurate measurement of air turbulence with a sonic anemometer is limited to the first few hundred feet above ground level, but are typically only used below 30 m.

Three other technologies which can remotely monitor atmospheric turbulence have also appeared over the past few decades, but are considerably more expensive and complicated than cup and vane or sonic anemometers. Doppler LIDAR (Light Detection and Ranging) shoots a narrow beam of light, such as that coming from a laser, into the upper atmosphere, where the light is reflected back by airborne particles or moisture droplets and observed by specialized optics. LIDAR is able to detect fluctuations in wind velocity and direction from miles away, but the cost of the laser, optics, and associated electronics make this system far too expensive for any but the most well-funded scientific installations. Doppler SODAR (Sonic Detection and Ranging) works on similar principles, except that sound is employed instead of light, and the physical process being measured is backscattered sound energy caused by atmospheric turbulence rather than direct reflection. The instrument measures turbulence up to several thousand feet above ground, but can require a reflective parabolic antenna up to four feet in diameter. Doppler wind profiler RADAR (Radio Detection and Ranging) works on a similar principles of the LIDAR and SODAR, although using radio waves. An additional limitation of the RADAR is due to the bandwidth requirements to operate the RADAR and the potential for interference with television and other radio signals. The bulk and fragility of the equipment dictates that LIDAR, SODAR, and RADAR systems are normally installed at permanent ground-based installations.

In summary, the present state of the art in atmospheric turbulence measurement is generally limited to either low-cost systems that determine only the mean wind speed and direction, or to higher-end instruments that measure also turbulence, but are either limited by their size, complexity, or cost to lower altitudes and localized installations.

SUMMARY OF THE INVENTION

In light of the problems and deficiencies inherent in the prior art, the present invention seeks to overcome these by providing an instrument capable of measuring both the mean speed and direction of common transparent or semi-transparent fluids, such as air or water, but is particularly adapted to the measurement of fluctuations in wind speed and direction brought on by atmospheric turbulence.

In the opto-mechanical anemometer of the present invention, a flexible directional light emitter, such as an optical fiber, extends transversely into the flow path of a transparent or semi-transparent fluid and is fixed or supported at one end. The free end of the directional light emitter is allowed to bend in response to forces generated by the flow of fluid. The fluid flow may be substantially steady-state or laminar and with a constant velocity in one direction, or the flow may be turbulent with localized fluctuations in both speed and direction. A light beam is projected from the light emitter to strike a stationary optical detector placed in the path of the beam. Deflection of the flexible directional light emitter in response to fluid forces translates into movement of the light beam over the detector, allowing measurement of the speed and direction of the fluid flow in two orthogonal planes. An array of opto-mechanical anemometers can be configured together on a probe to measure both the steady-state flow and fluctuation in the flow in three directions.

The present invention also includes a method for measuring the flow of a transparent or semi-transparent fluid in two directions, which method comprises positioning a flexible directional light emitter, such as an optical fiber, in the flow of a fluid; orientating the light emitter transverse to the flow of the fluid with the base of the light emitter being fixed motionless against the flow of the fluid; and causing the tip of the light emitter to bend freely in response to the flow of the fluid. The method further comprises projecting a beam of light from the tip of flexible directional light emitter toward an optical detector which is locating the path of the beam of light; and monitoring the location of peak intensity of the beam of light on the face of the optical detector, which is responsive to the impacting beam of light. The method can also include calculating fluctuations in the flow of the fluid from movements of the beam of light across the face of the optical detector, and arranging an array of directional light emitters and complementary optical detectors on a probe to measure the flow of the fluid in all three directions.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 1 is a side elevation, cross-sectional view the opto-mechanical anemometer, according to one embodiment of the invention;

DETAILED DESCRIPTION OF EXEMPLARY EMBODIMENTS

Figure 2:
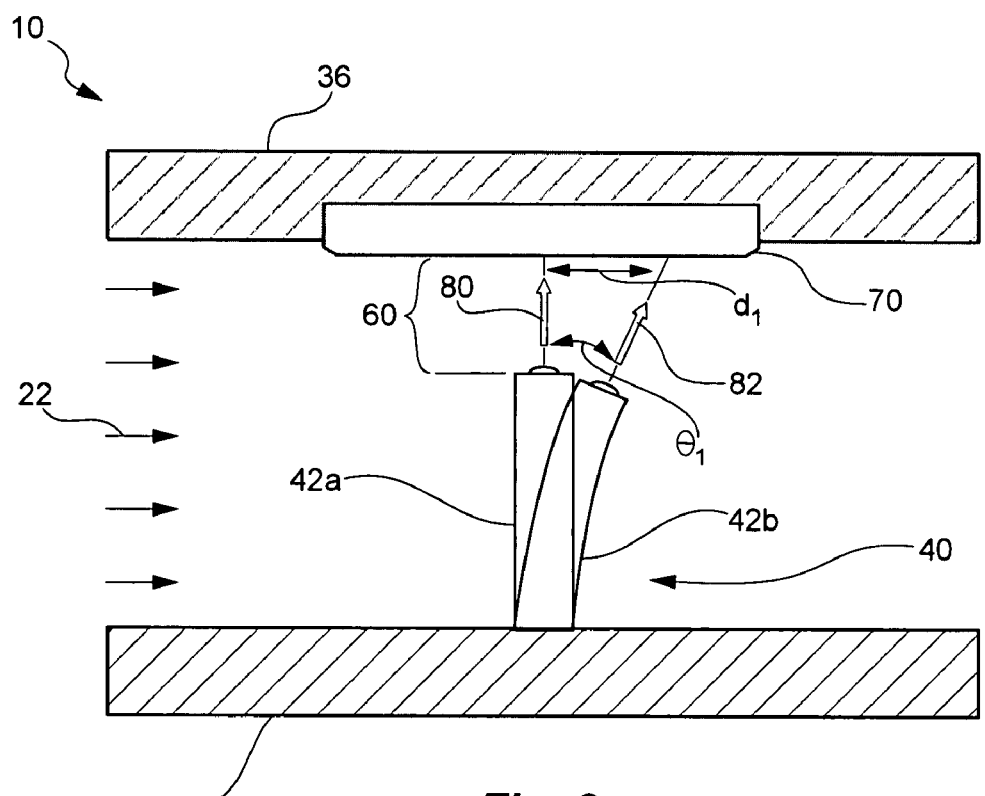
FIG. 2 is a side elevation view of the opto-mechanical anemometer illustrating the deflection of the directional light emitter in response to laminar flow, according to the embodiment of FIG. 1.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

FIGS. 1-6 show various exemplary embodiments of a miniature opto-mechanical anemometer 10 for measuring fluctuations in the flow of the fluid brought on by turbulence as well as the mean speed and direction of a fluid. As illustrated in FIG. 1 and according to one embodiment of the present invention, a fluid 20 is directed through a channel or conduit bounded on at least two sides by an emitter support 34 and a detector support 36. It is to be understand by one having skill in the art that the configuration of the emitter support and detector support is merely illustrative of various potential applications for the present invention, as the cross-sectional drawing of FIG. 1 could represent fluid flow through a round pipe, along the bottom of an open-topped conduit, between two large parallel plates (such as in a heat exchanger), between two structural prongs inserted in the open air, between two disc bodies placed in any fluid medium, or any other similar configuration.

A directional light emitter 40, comprising a flexible arm section 42 and a laser or LED light source light source 50, is attached to the emitter support 34. The directional light emitter may also extend through the emitter support to include an optional back section 48. The flexible arm section has a long axis and is positioned in an orientation transverse to the flow of the fluid. According to the embodiment illustrated in FIG. 1, the directional light emitter's flexible arm section extends through the emitter support and is hollow with an inner light passage 52, as is typical with an optical cable. Thus the flexible arm section has a tip end 44 and a base end 46 where it connects to or passes through the emitter support. The back section 48 of the directional light emitter may extend any distance from the base end of the flexible arm section.

According to the embodiment shown in FIG. 1, the light source 50 is connected to the back section 48 of the directional light emitter 40 and projects light into the inner light passage 52. At the base section 46 the flexible arm section is firmly fixed and held by the emitter support 34 to prevent movement of the structure in relation to the emitter support. The tip end 44 of the flexible arm section is unsupported, however, and is allowed to bend and move with the flow of the fluid. The tip end also has an opening 56 to the inner light passage. Following its simple design, the directional light emitter projects an intense, narrow beam of light out of this opening which can be concentric with the long axis of the flexible arm section. In an alternative embodiment (not shown) the beam of light can also be projected from the tip end of the flexible arm at an angle which diverges from the long axis. The beam of light moves with the bending of the flexible arm section in response to forces imposed by the fluid flow. A fluid-tight lens 58 or transparent cover can be placed over the top of the opening if it is deemed necessary to protect the light source from the fluid being measured.

An optical detector 70 is attached to the detector support 36 in a location which is opposite the directional light emitter 40 and intersects the beam of light. The optical detector has a face surface 72 which is sensitive to the point of maximum intensity of the beam of light. The face surface of the optical detector and the tip end of the flexible arm section are separated by a short gap 60.

As illustrated in FIG. 1, the flexible arm section can follow the design of an optical cable with an inner light passage. However, in another embodiment 10a of the present invention the flexible arm section 42a may be manufactured without an inner light passage, in which case there may be no back section, the flexible arm section is connected directly to the emitter support 34a, and the directional light source 50a, such as a laser, LED or other source of intense light, could be located in the tip end 44a. In yet another embodiment 10b a stiffening structure 62b may be attached to the flexible arm section 42b to better control the movement of the structure when it is used to measure high velocity fluids or fluids with a high viscosity. The stiffening structure 62b can take the form of a rib, as shown, or can also take the form of a cylindrical or conical sleeve or any other structure capable of adding stiffness to the flexible arm section 42b of the present invention.

It is to be understood by one having skill in the art that the measured fluid may be air, natural gas, nitrogen, water, gasoline, or any other fluid which is substantially transparent to at least one frequency of light, so as to allow the passage of light across gap 60, from the tip end of the directional light emitter to the face 72 of the optical detector 70. It is further appreciated that the light generated by the directional light emitter can be monochromatic and can fall into the range of electromagnetic frequencies which are visible to the human eye in a preferred embodiment of the present invention, yet in other embodiments the frequency of light both generated by the directional light emitter and captured by the optical detector can fall outside the range of frequencies visible to the human eye, either above the visible range in ultra-violet frequencies or higher, or below the visible range in infrared frequencies or lower.

FIG. 2 illustrates the embodiment of the present invention shown if FIG. 1 when it is firstly in a non-operational state, and secondly subjected to a state of constant, laminar flow 22. The directional light emitter 40 is securely attached to the emitter support 34 in an orientation that is transverse to the path of the flow of the fluid. In the non-operational state, the flexible arm section 42a is in the neutral position 80, projecting a beam of light from the tip of the directional light emitter across gap 60 to contact the optical detector 70. When the invention is later subjected to the second state of fluid flowing in a constant, laminar manner 22, the passage of the fluid around the flexible arm section 42b exerts a force on the structure causing it to bend through angle $\theta_1$. This motion moves the beam of light 82 through distance $d_1$ to a new position. When the physical properties of the flexible arm section are known, such as the stiffness, length, and exposed surface area, along with the physical properties of the fluid, such as the viscosity, one can calculate the speed of the fluid directly from the value for distance $d_1$.

It is not readily apparent from FIG. 2, but the optical detector 70 measures the direction of the flow of fluid in two planes, horizontally and into the plane of the paper. By measuring both speed and direction, the present invention is able to provide the user with an instantaneous reading of the two-dimensional flow vector of the fluid. This information would be highly valued by scientists and engineers in any field involving fluid dynamics, including but not limited to meteorology, oceanography, process and piping design, HVAC design, civil and environmental engineering, etc.

Figure 3:
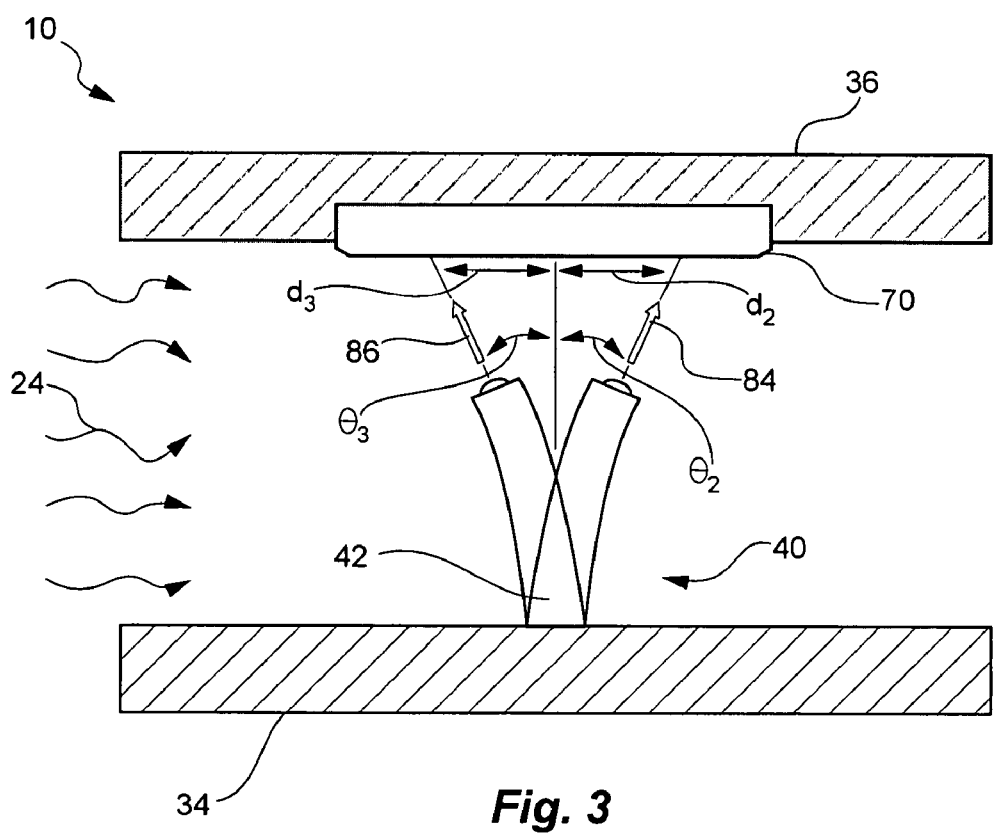
FIG. 3 is a side elevation view of the opto-mechanical anemometer illustrating the deflection of the directional light emitter in response to turbulent flow, according to the embodiment of FIG. 1.

FIG. 3 illustrates the operation the embodiment shown in FIG. 1 when it is subject to the flow of a turbulent fluid 24. In a turbulent state of operation, the directional light emitter would rarely be found in a neutral position. To the contrary, the directional light emitter would constantly be bending from some angle $\theta_2$ to some angle $\theta_3$, and vice versa. The optical detector would track these motions as movements of the point of peak intensity 84 across distance $d_2$ in response to a momentary acceleration/deceleration of the air parcels in the flow, or movement of the point of peak intensity 86 across distance $d_3$ in response to a temporary flow reversal. The fluctuations in flow velocity may be quite fast, and in one embodiment of the present invention the optical detector is capable of monitoring these motions at frequencies up to 1,000 Hz.

FIG. 4 is an illustration of a another embodiment of the present invention 110 that may be used to monitor turbulent airflow in the atmosphere. The embodiment includes a pair of prongs 134 which project from a support base 130 up into the air flow 124 in an orientation that transverses the normal flow path of the air, as shown in FIG. 4(a). FIG. 4(b) illustrates that one of the support prongs acts as the emitter support 134, while the other serves as the detector support 136. The directional light emitter 140 is comprised of a fiber optic cable which extends up through the emitter support and then out the side of the emitter support near its upper end. The fiber optic cable has a laser or LED light source 150, a back section 148 which can run down the length of the emitter support prong, and a flexible arm section 142. Furthermore, the flexible arm section has a base end 146 where the optical cable exits the emitter support, and a tip end 144 which is directed towards the optical detector 170 mounted in the detector support prong 136. In a preferred embodiment, the back section 148 is considerably longer than the flexible arm section as the optical cable must extend all the way down the emitter support prong and through the support base before connecting to the light source 150.

The directional light emitter 140 may be manufactured using optical fibers with various wall thicknesses or have a surrounding structure that is calibrated with a stiffness to partially resist the forces created by the fluid being measured. Furthermore, the directional light emitter may be tuned to respond to small and localized fluctuations in fluid speed and direction brought on by turbulence.

Figure 4A:
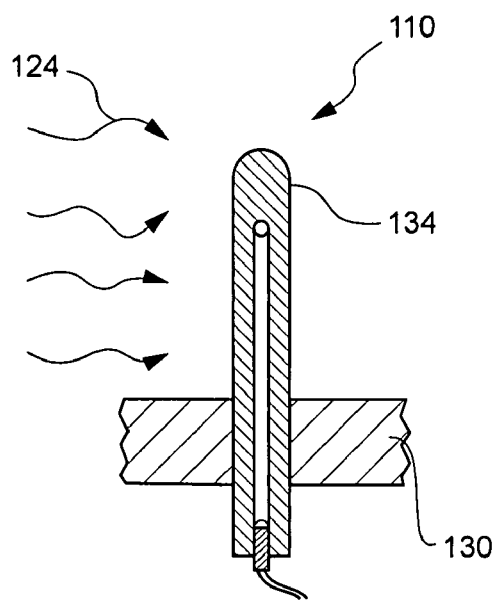
FIG. 4 is a side cross-sectional, front cross-sectional, and top elevation view of the opto-mechanical anemometer, according to another embodiment of the present invention.
Figure 4C:
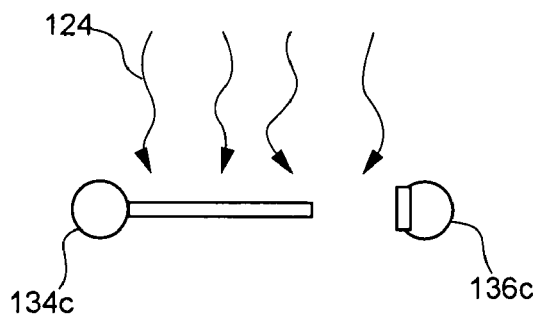
Figure 4D:
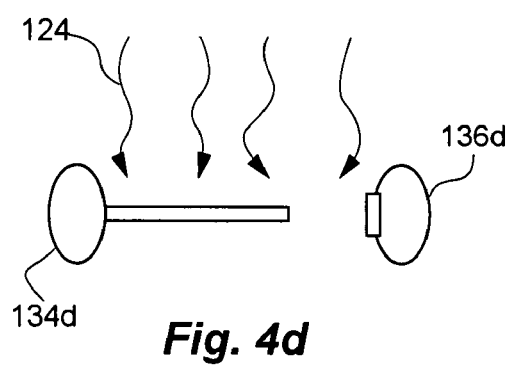
Figure 4B:
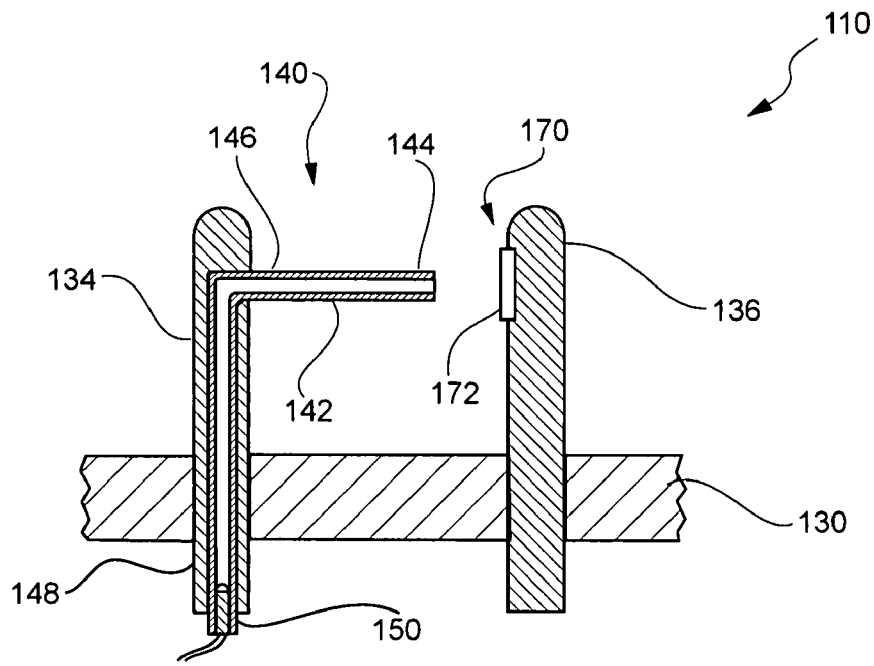

The optical detector 170 is mounted in the detector support 136 with its detector face 172 facing the tip end 144 of the flexible arm section 142. The optical detector may be mounted flush with the surface of the detector support to reduce disturbance of the airflow around the detector support. Furthermore, as shown in FIG. 4c, both support prongs and the support base 130 can have a round profile, or can be aerodynamically shaped (FIG. 4d) to minimize the creation of unwanted turbulence generated by the instrument itself.

Figure 5A:
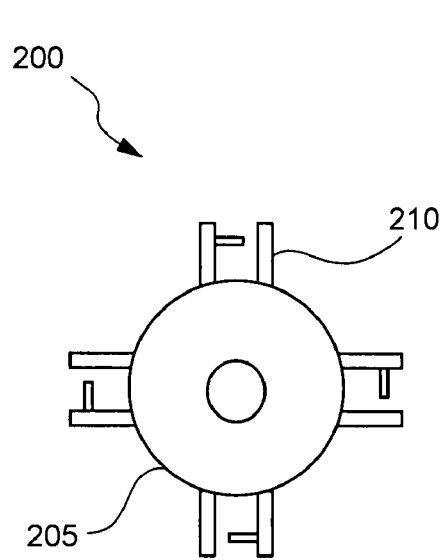
FIG. 5 is a front elevation and top elevation view of yet another embodiment of the present invention mounted on the exterior surface of a probe.
Figure 5B:
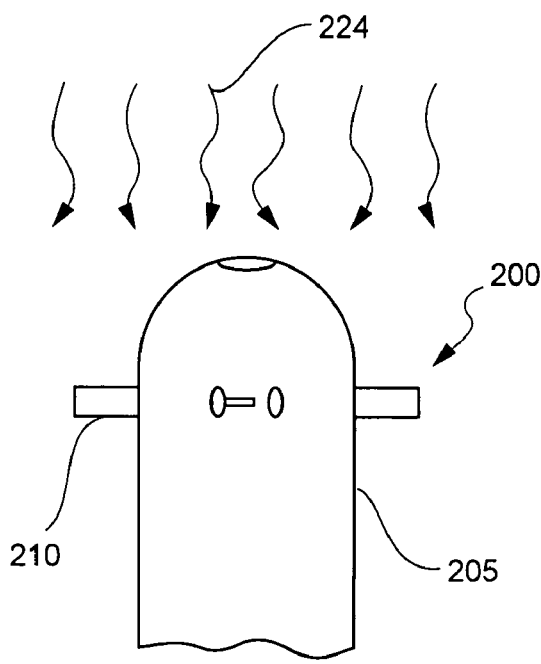

As shown in FIGS. 5a and 5b, in yet another embodiment 200 of the present invention a plurality of miniature flow detectors 210 can be arranged on a probe 205 to form an array. Using multiple flow detectors at a single location can provide redundancy in case one flow detector should fail or suffer damage, as well as improve the statistical accuracy of the measurements. Furthermore, since each flow detector is only capable of measuring flow in two planes, by arranging one or more flow detectors in a position orthogonal to the others all three directions can be monitored, providing a measurement of the flow of fluid 224 in three planes.

Figure 6:
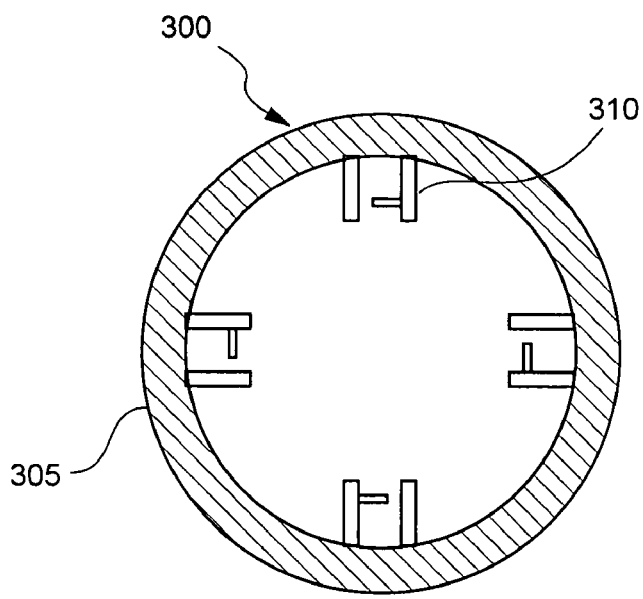
FIG. 6 is a front, cross-sectional view of another embodiment of the present invention mounted within the interior of a pipe.

Furthermore, as shown in FIG. 6, in another embodiment 300 this same principle can be applied to the flow of a fluid through a pipe 305. A plurality of miniature flow detectors 310 can be arranged around the interior circumference of the pipe to measure fluctuations in the fluid in all three directions, as well as the mean speed of the fluid flowing through the pipe. Each detector could be mounted individually and at various axial locations along the pipe, or all could be grouped together as a single laminar/turbulent flow instrument mounted within an individual section of pipe, providing simple installation into new and existing piping systems.

It is one object of the miniature flow detector of present invention, as shown in FIG. 4, to be mounted as an opto-mechanical anemometer either on a weather balloon instrument package or a UAV (Unmanned Aerial Vehicle) to easily measure turbulence in the atmosphere at locations that are too high for sonic anemometers and too remote for LIDAR, SODAR or doppler wind profiler RADAR. Furthermore, with models that are both low-powered, low-cost and disposable, authorities could place an array of such instruments on urban buildings and structures to monitor the flow of air through a city. This would enable Homeland Security officials to predict the path of a plume after a terrorist event, or even allow experts to calculate the movements of air borne pollutants in environmentally sensitive areas.

It is another object of the present invention to acquire accurate and continuous measurements of the turbulent flow of a transparent or semi-transparent fluid through a conduit or a pipe, allowing the operators of process facilities to better control their procedures to improve productivity, efficiency and equipment reliability.

It is yet another object of the present invention that it could be made sufficiently small to monitor the turbulent flow of air from the breath of a patient as part of a respiratory monitoring device.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Moreover, any steps recited in any method or process claims may be executed in any order and are not limited to the order presented in the claims. Accordingly, the scope of the invention should be determined solely by the appended claims and their legal equivalents, rather than by the descriptions and examples given above.

What is claimed and desired to be secured by Letters Patent is:

1. An apparatus for detecting fluctuations in the flow of a fluid comprising:
    a directional light emitter positioned transverse to the flow of the fluid, further comprising:
        a flexible arm section having a long axis with a base end and a tip end, wherein the base end is fixed and the tip end is unsupported, to allow the flexible arm section to bend with the flow of the fluid, and wherein the flexible arm section perturbates about a nominal position in response to fluctuations in the flow of the fluid; and
        a light source connected to the flexible arm section and configured to project a beam of light from the tip end of the flexible arm section; and
    at least one optical detector positioned to be responsive to the beam of light, wherein the optical detector is configured to sense lateral movements of the beam of light as the flexible arm section perturbates in response to fluctuations in the flow of the fluid and wherein the detector is capable of monitoring lateral movements having frequencies up to 1000 Hz.

2. The apparatus of claim 1, wherein the beam of light projected from the tip end of the flexible arm is concentric with the long axis.

3. The apparatus of claim 1, wherein the beam of light is projected from the tip end of the flexible arm at an angle divergent from the long axis.

4. The apparatus of claim 1, wherein the directional light emitter further comprises a back section integral with the flexible arm section, wherein a common inner light passage passes through the back section and the flexible arm section.

5. The apparatus of claim 4, wherein the light source connects to the back section of the directional light emitter to project the beam of light through the inner light passage and out an opening in the tip end of the flexible arm section.

6. The apparatus of claim 5, wherein the directional light emitter is an optical fiber.

7. The apparatus of claim 1, wherein the light source is a laser.

8. The apparatus of claim 1, wherein the light source is an LED.

9. The apparatus of claim 1, wherein the beam of light is monochromatic.

10. The apparatus of claim 1, wherein the base end is fixed by connection to a wall of a passageway orientated substantially parallel to the direction of the flow of the fluid, and further wherein the flexible arm section has been mechanically stiffened to resist nominal motion of the flow such that the orientation of the flexible arm section is substantially perpendicular to the wall when the flow of the fluid is nominal and non-fluctuating.

11. The apparatus of claim 1, wherein the optical detector further comprises a face surface, wherein the face surface is sensitive to peak intensity of the beam of light.

12. The apparatus of claim 1, wherein the detector is capable of monitoring movement of the beam of light in two planes.

13. The apparatus of claim 1, wherein a plurality of directional light emitters and complementary optical detectors can be arranged on a probe to form an array.

14. The apparatus of claim 13, wherein the array of directional light emitters and complementary optical detectors can be configured to measure the flow of fluid in three planes.

15. A method for measuring the flow of a fluid in two directions, the method comprising the steps of:
    a) positioning a flexible arm section in a flow of a fluid, the flexible arm section having a long axis with a base end and a distal end;
    b) orientating the flexible arm section transverse to the flow of the fluid with the base end of the flexible arm section being fixed motionless against the flow of the fluid;

c) causing the distal end of the flexible arm section to bend freely in response to the flow of the fluid, so that the flexible arm section perturbates about a nominal position in response to fluctuations in the flow of the fluid, so that the flexible arm section perturbates about a nominal position in response to fluctuations in the flow of the fluid;

d) projecting a beam of light from the distal end of the flexible arm section toward an optical detector, wherein the optical detector is located in a pathway of the beam of light; and e) monitoring a location of the beam of light impacting on the optical detector, the optical detector being responsive to the position of peak intensity of the beam of light on a face of the optical detector, and where the optical detector is capable of monitoring perturbations in the position of peak intensity having frequencies up to 1000 Hz.

16. The method of claim 15, wherein the flow of the fluid is turbulent.

17. The method of claim 15, further comprising calculating a fluctuation in the flow of the fluid from a movement of the beam of light across the face of the optical detector.

18. The method of claim 15, further comprising arranging an array of directional light emitters and complementary optical detectors on a probe to measure the flow of the fluid in three directions.

19. An apparatus for detecting fluctuations in the flow of a fluid comprising:

a directional light emitter positioned transverse to the flow of the fluid, further comprising:

a flexible arm section having a long axis with a base end and a tip end, wherein the base end is fixed by connection to a wall of a passageway orientated substantially parallel to the direction of the flow of the fluid and the tip end is unsupported, to allow the flexible arm section to bend with the flow of the fluid, and where the flexible arm section has been mechanically stiffened to resist nominal motion of the flow such that the orientation of the flexible arm section is substantially perpendicular to the wall when the flow of the fluid is nominal and non-fluctuating; and a light source connected to the flexible arm section and configured to project a beam of light from the tip end of the flexible arm section; and at least one optical detector positioned to be responsive to the beam of light, wherein the optical detector is configured to sense a lateral movement of the beam of light as the directional light emitter deflects in response to the flow of the fluid.

20. The apparatus of claim 18, wherein the beam of light projected from the tip end of the flexible arm is concentric with the long axis.

21. The apparatus of claim 18, wherein the beam of light is projected from the tip end of the flexible arm at an angle divergent from the long axis.

22. The apparatus of claim 18, wherein the directional light emitter further comprises a back section integral with the flexible arm section, wherein a common inner light passage passes through the back section and the flexible arm section.

23. The apparatus of claim 21, wherein the light source connects to the back section of the directional light emitter to project the beam of light through the inner light passage and out an opening in the tip end of the flexible arm section.

24. The apparatus of claim 23, wherein the directional light emitter is an optical fiber.

25. The apparatus of claim 19, wherein the light source is a laser.

26. The apparatus of claim 19, wherein the light source is an LED.

27. The apparatus of claim 19, wherein the beam of light is monochromatic.

28. The apparatus of claim 19, wherein the optical detector further comprises a face surface, wherein the face surface is sensitive to peak intensity of the beam of light.

29. The apparatus of claim 19, wherein the detector is capable of monitoring movement of the beam of light in two planes.

30. The apparatus of claim 19, wherein the detector is capable of monitoring oscillations of the beam of light at frequencies up to 1000 Hz.

31. The apparatus of claim 1, wherein a plurality of directional light emitters and complementary optical detectors can be arranged on a probe to form an array.

32. The apparatus of claim 4, wherein the array of directional light emitters and complementary optical detectors can be configured to measure the flow of fluid in three planes 33. A method for measuring the flow of a fluid in two directions, the method comprising the steps of:

a) positioning a flexible arm section in a flow of a fluid, the flexible arm section having a long axis with a base end and a distal end;

b) orientating the flexible arm section transverse to the flow of the fluid with the base end of the flexible arm section being fixed motionless against the flow of the fluid;

c) causing the distal end of the flexible arm section to bend in response to fluctuations in the flow of the fluid, where the flexible arm section has been mechanically stiffened to resist nominal motion of the flow such that the orientation of the flexible arm section is substantially perpendicular to the wall when the flow of the fluid is nominal and non-fluctuating;

d) projecting a beam of light from the distal end of the flexible arm section toward an optical detector, wherein the optical detector is located in a pathway of the beam of light; and e) monitoring a location of the beam of light impacting on the optical detector, the optical detector being responsive to the position of peak intensity of the beam of light on a face of the optical detector.

34. The method of claim 33, wherein the flow of the fluid is turbulent.

35. The method of claim 33, further comprising calculating a fluctuation in the flow of the fluid from a movement of the beam of light across the face of the optical detector.

36. The method of claim 33, further comprising arranging an array of directional light emitters and complementary optical detectors on a probe to measure the flow of the fluid in three directions.

* * * * *